(12) United States Patent
Giles

(10) Patent No.: US 8,360,279 B1
(45) Date of Patent: Jan. 29, 2013

(54) AUTOMATIC BABY FORMULA PREPARATION DEVICE

(76) Inventor: Matthew L. Giles, Spanish Fork, UT (US)

( * ) Notice: Subject to any disclaimer, the term of this patent is extended or adjusted under 35 U.S.C. 154(b) by 571 days.

(21) Appl. No.: 12/626,097

(22) Filed: Nov. 25, 2009

Related U.S. Application Data

(60) Provisional application No. 61/200,204, filed on Nov. 26, 2008.

(51) Int. Cl.
| | |
|---|---|
| B67D 7/78 | (2010.01) |
| B01F 15/04 | (2006.01) |
| H05B 6/80 | (2006.01) |
| B67C 3/26 | (2006.01) |
| A47J 31/40 | (2006.01) |

(52) U.S. Cl. .................. 222/145.6; 222/135; 222/129.4; 366/160.1; 366/181.3; 219/689; 219/469; 219/432; 141/256; 141/362; 99/280; 99/288; 99/486

(58) Field of Classification Search .................. 222/129, 222/129.1, 129.2, 129.3, 129.4, 135, 145.5, 222/145.6, 146.2, 146.5, 450; 99/280, 288, 99/483, 486, 487, 489, 342, 325, 323.3; 366/145, 366/146, 160.1, 181.3, 192, 193, 160.5; 206/220; 392/394, 386, 465; 141/256, 360, 362, 369; 165/61, 64, 185, 186; 219/428, 432, 469, 219/687, 689

See application file for complete search history.

(56) References Cited

U.S. PATENT DOCUMENTS

| | | | | |
|---|---|---|---|---|
| 3,084,613 | A | * | 4/1963 | Maxson ............................ 99/282 |
| 3,822,810 | A | * | 7/1974 | Fuqua .......................... 222/146.5 |
| 4,015,749 | A | * | 4/1977 | Arzberger et al. ............. 222/640 |
| 4,116,246 | A | * | 9/1978 | Franzen .......................... 141/362 |
| 4,872,404 | A | * | 10/1989 | Quetsch et al. ................ 100/125 |
| 5,191,918 | A | * | 3/1993 | Cahlander et al. ................. 141/1 |
| 5,570,816 | A | | 11/1996 | LaBarbera, Jr. |
| 5,797,313 | A | | 8/1998 | Rothley |
| 5,970,847 | A | | 10/1999 | Saltzman |
| 6,412,527 | B1 | | 7/2002 | Brice |
| 6,419,120 | B1 | * | 7/2002 | Bertone ....................... 222/129.4 |
| 6,711,990 | B1 | | 3/2004 | Harrison |
| 6,837,397 | B2 | * | 1/2005 | Lassota ....................... 222/129.3 |
| 6,874,660 | B2 | * | 4/2005 | Bertone ....................... 222/129.4 |
| 6,951,166 | B1 | | 10/2005 | Sickels |
| 7,044,336 | B2 | * | 5/2006 | Bertone ....................... 222/129.4 |
| 7,104,184 | B2 | | 9/2006 | Biderman et al. |
| D534,028 | S | | 12/2006 | Artis |
| D544,287 | S | | 6/2007 | Joss et al. |

* cited by examiner

*Primary Examiner* — Kevin P Shaver
*Assistant Examiner* — Stephanie E Williams
(74) *Attorney, Agent, or Firm* — Montgomery Patent & Design LLC; Robert C. Montgomery

(57) ABSTRACT

An automatic home appliance that performs the preparation, mixing, and heating of infant formula bottles provides a reservoir on top that holds an amount of powdered formula. Connection to a household water supply provides a flow of water to an internal water heating reservoir. A central front opening is provided in which the infant bottle is placed. A digital display and a plurality of programming buttons are arranged upon a front panel to allow the user to select operating parameters. Once programmed, internal electronic controls perform dispensing and mixing of the necessary ingredients in the proper ratio and dispensing of mixed formula into the proper sized bottle. The mixture is also kept warm at the proper temperature by a hot plate. An indicator light then illuminates to communicate to a user that the bottle is ready to be removed and the mixture consumed.

7 Claims, 3 Drawing Sheets

AUTOMATIC BABY FORMULA PREPARATION DEVICE

RELATED APPLICATIONS

The present invention was first described in and claims the benefit of U.S. Provisional Application No. 61/200,204, filed Nov. 26, 2008, the entire disclosures of which are incorporated herein by reference.

FIELD OF THE INVENTION

The present invention relates generally to infant feeding bottles, and in particular, to an apparatus for the automated mixing, dispensing, and heating of infant formula into a standard infant feeding bottle.

BACKGROUND OF THE INVENTION

One (1) of the most important functions of childrearing is that of successfully and healthily nourishing small children and infants. Infant bottles provided with infant formula represent one (1) of the most common forms of feeding very small infants in the modern day. Infant formula provides nutrients which are particularly beneficially to infants in their early stages of development, and common infant bottles provide a method of feeding which is familiar, simple, and comfortable for both infants and their care providers.

A longstanding problem in the field of infant feeding bottles is that of the preparation of the bottle and the formulas commonly utilized with the bottles. Various aspects of the preparation can cause consternation, especially for first time care providers. The bottle can be time consuming to disassemble, fill, mix, and reassemble for a child. The proportion of water to dry formula is also important, as young children are particularly sensitive to their diets. Furthermore, achieving an ideal temperature for the mixture is difficult, because the formula is designed to be consumed at a warm temperature, while overheating the formula can cause discomfort for the infant. Similar to mixing proportions, achieving a consistent feeding temperature is both very important and nearly impossible to replicate perfectly by manual methods.

Various attempts have been made to provide an apparatus which assists in the preparation of infant feeding bottles and infant formula. Examples of these attempts can be seen by reference to several U.S. patents. U.S. Pat. No. 5,970,847, issued in the name of Saltzman, describes a baby formula preparation system. The Saltzman apparatus is essentially an infant formula blender for thoroughly mixing water and baby formula, with a spout for directly pouring water into the blender.

U.S. Pat. No. 6,951,166, issued in the name of Sickels, describes a unit for preparing baby formula. The Sickels apparatus is capable of heating water to a predetermined temperature and mixing it with dry infant formula.

U.S. Pat. No. 7,104,184, issued in the name of Biderman, describes a feeding formula appliance. The Biderman apparatus functions to keep water at a predetermined temperature or temperatures for dispensation by a user as needed for the preparation of infant feeding formula.

Additionally, ornamental designs for an infant formula preparation apparatus exist, particularly U.S. Pat. Nos. D 534,028 and D 544,287. However, none of these designs are similar to the present invention.

While these devices fulfill their respective, particular objectives, each of these references suffer from one (1) or more of the aforementioned disadvantages. Many such apparatuses do not provide a full range of automation for maximum efficiency. Also, many such apparatuses do not allow for consistent, user-selected automated temperature control. In addition, many such apparatuses require a user to add water as opposed to utilizing an electronically controlled water amount derived from a connection to an existing water source. Furthermore, many such apparatuses do not allow a user to select variable amounts of water for different feeding portions or amounts. Accordingly, there exists a need for an automated infant feeding formula preparation assistance apparatus which saves a user a substantial amount of preparation time without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide an apparatus for the automated mixing, heating, and dispensation of infant feeding formula into a standard infant bottle in a manner which provides a user with a wide range of adjustable automated time-saving functionality. Thus, the object of the present invention is to solve the aforementioned disadvantages and provide for this need.

To achieve the above objectives, it is an object of the present invention to comprise a multifunctional beverage processing device for the preparation, mixing, heating, and dispensation of baby formula. The device comprises a housing which further comprises an internal reservoir, a water reservoir, a mixing chamber, a dispensing tube mechanism and a plurality of dispensing tubes, a solenoid valve and opposing stop mechanism, a dispensing area, and an internal control module.

Another object of the present invention is to comprise the internal reservoir and water reservoir of reservoirs situated within the housing which are adapted to hold baby formula and a connection to an existing water supply, respectively. The mixing chamber comprises an internal chamber adapted to receive and mix baby formula and water from the reservoirs.

Yet still another object of the present invention is to comprise the dispensing tube mechanism and dispensing tubes of a series of common liquid dispensing tubes designed to carry formula from the mixing chamber to the dispensing area. The solenoid valve and stop mechanism comprise a common solenoid valve which controls the flow of the mixed baby formula through the tubes in an automated manner, allowing a user-selected volume of the formula to enter a cup, bottle, or the like placed by a user in the dispensing area.

Yet still another object of the present invention is to comprise the internal control module of an electronic control module which communicates with the reservoirs, mixing chamber, solenoid valve, and dispensing area to automatically perform a sequence of timed process steps to properly mix, dispense, and heat the baby formula.

Yet still another object of the present invention is to further comprise the internal reservoir of a horizontal sliding door to allow a user access in order to add dry baby formula, as well as a motorized auger and horizontal formula gate at the bottom of the reservoir which are adapted to dispense the dry baby formula from the reservoir into the mixing chamber.

Yet still another object of the present invention is to comprise the existing water supply connection of a connector assembly, a water filter, a warm water tube, a water flow solenoid valve, a water nozzle inside the mixing chamber, a first thermocouple and a water heater within the water reservoir. The thermocouple sends signals to the control module which allow the module to selectively activate the water heater.

Yet still another object of the present invention is to comprise the mixing chamber of a mixing motor, a shaft-driven mixing impeller powered by the motor, and a dispensing spout. The apparatus is designed so that the mixing impeller only operates while the formula gate and solenoid valve are closed.

Yet still another object of the present invention is to comprise the dispensing area of a cup-shaped hot plate capable of stably supporting a common baby bottle. The hot plate comprises a thermally conductive metal base with an internal resistance heating coil, a second thermocouple, and a hot plate insert. The thermocouple sends signals to the control module which allow the module to selectively activate the hot plate. The housing further comprises an indicator light which is lit by the control module when the prepared formula is ready for consumption.

Yet still another object of the present invention is to provide a method of utilizing the device that provides a unique means of allowing a user to add dry baby formula to the apparatus, specify an amount of formula to be prepared, and subsequently mix, dispense, and heat the formula in a quick, simple, accurate and automated manner.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
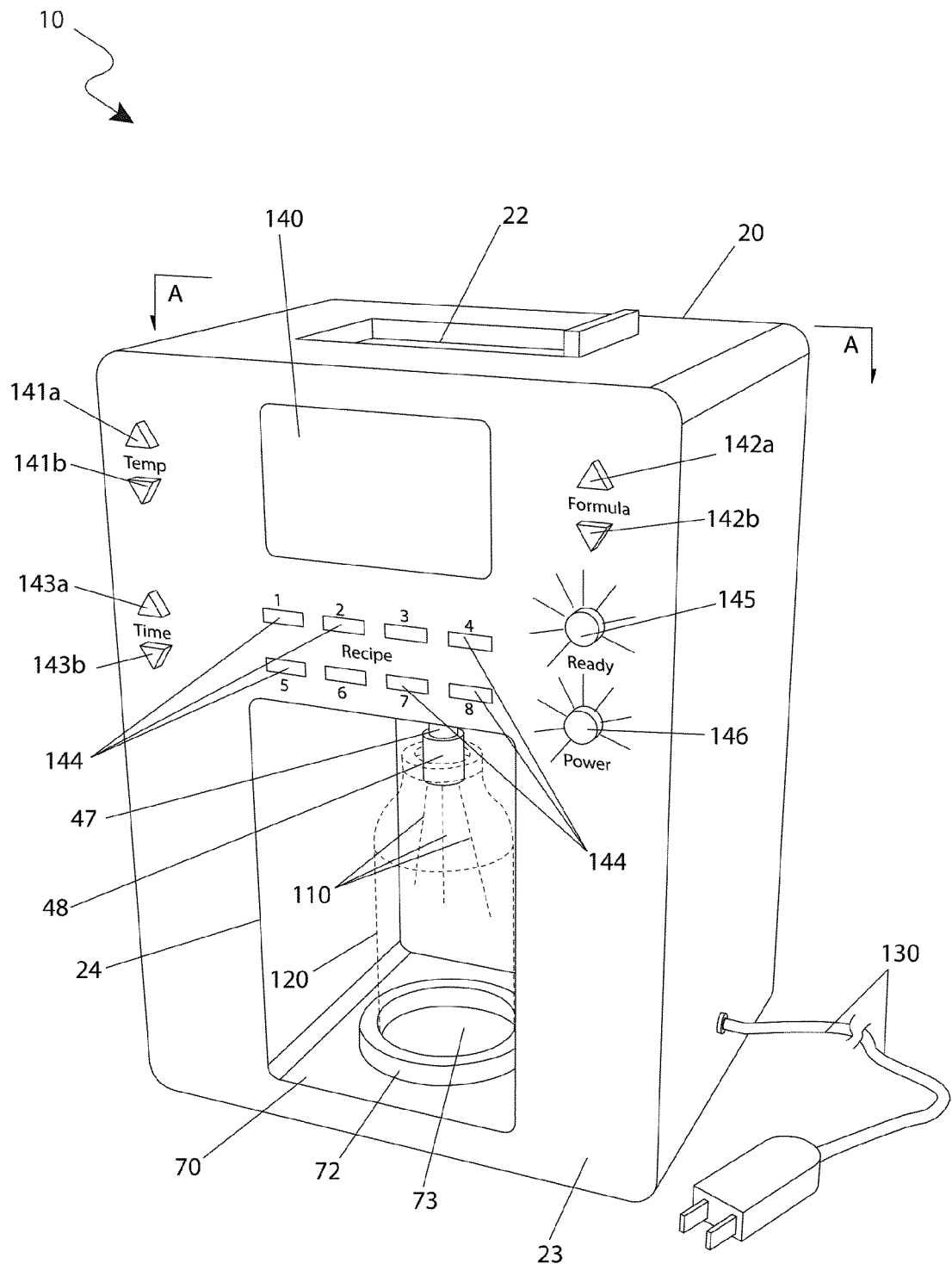
FIG. 1 is a front perspective view of an automatic baby formula preparation machine 10, according to a preferred embodiment of the present invention.

DESCRIPTIVE KEY 10 automatic baby formula preparation machine
20 housing
21 formula reservoir
22 formula door
23 front panel
24 dispense area
30 auger assembly
31 formula gate
32 formula gate solenoid
35 mixing chamber
39 stop mechanism
40 mixing impeller
41 mixing shaft
42 mixing motor
43 dispensing valve
44 dispensing tube mechanism
45 dispensing solenoid
46 spout
47 first dispensing tube
48 second dispensing tube
50 water supply line
51 water filter
52 warm water reservoir
53 water tube
54 solenoid valve
55 water nozzle
56 control module
57 wiring
60 first thermocouple
65 second thermocouple
70 hot plate
71 hot plate heating coil
72 hot plate insert
73 nesting feature
75 water heater
100 water
101 connector
102 water line
105 formula powder
110 mixed formula
120 bottle
130 power cord
140 display
141*a* temperature increment button
141*b* temperature decrement button
142*a* formula increment button
142*b* formula decrement button
143*a* time increment button
143*b* time decrement button
144 recipe preset button
145 ready indicator lamp
146 power indicator lamp

DETAILED DESCRIPTION OF THE PREFERRED EMBODIMENT

Figure 2:
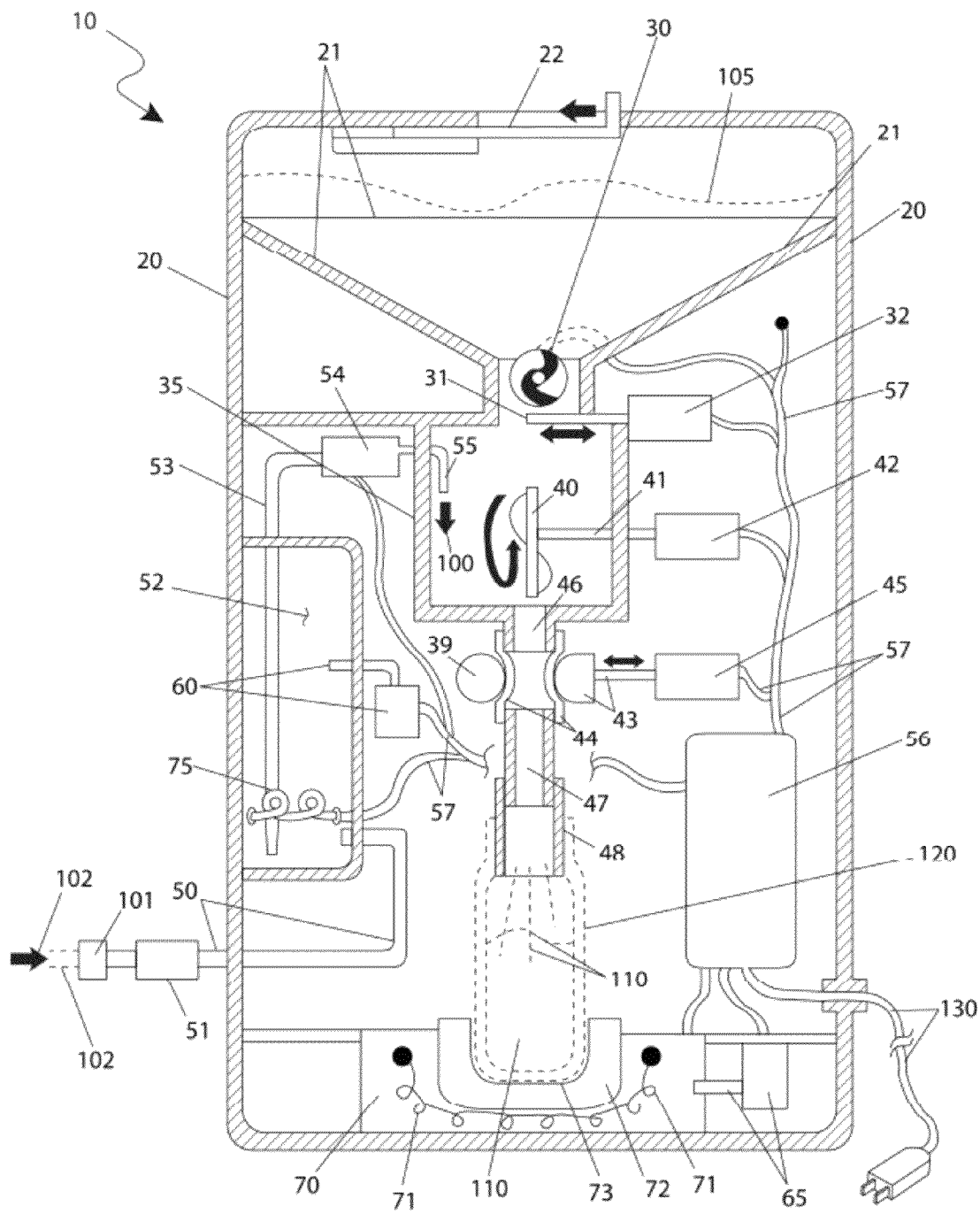
FIG. 2 is a section view taken along section line A-A (see FIG. 1) of an automatic baby formula preparation machine 10, according to a preferred embodiment of the present invention; and, FIG. 3 is an electrical block diagram of an automatic baby formula preparation machine 10, according to a preferred embodiment of the present invention.
Figure 3:
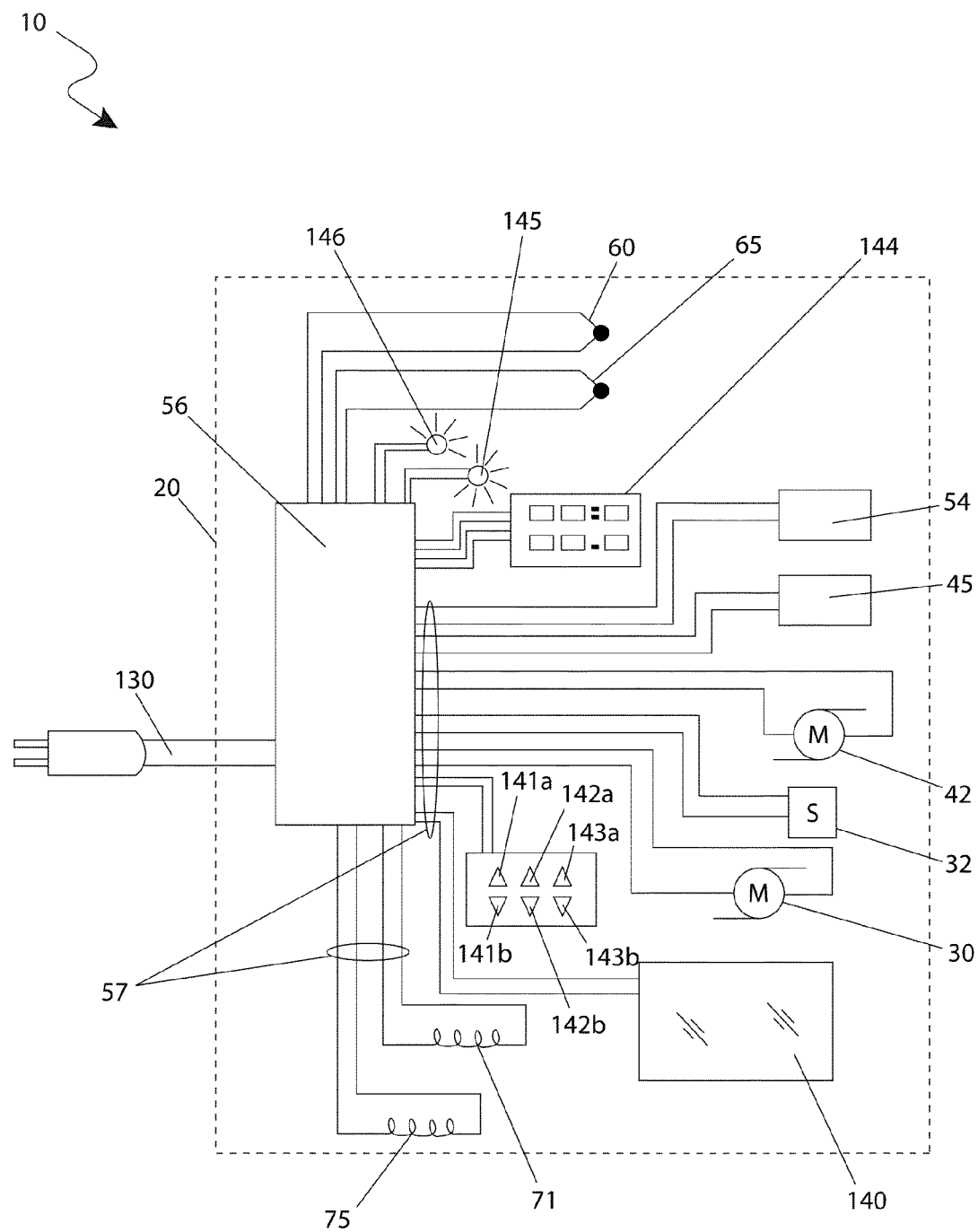

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an automatic baby formula preparation machine (herein described as the "apparatus") 10, which provides a countertop home appliance that performs the preparation, mixing, bottling, and warming of infant formula 110.

Referring now to FIG. 1, a front perspective view of the apparatus 10, according to the preferred embodiment of the present invention, is disclosed. The apparatus 10 comprises a housing 20 which is approximately a size of a large coffee maker with a door 22 located along a top surface allowing access thereto an internal formula reservoir 21 that holds a volume of powdered baby formula 105. Supply water 100 is provided via connection to a household water supply 50 thereto an internal warm water reservoir 52 (see FIG. 2).

The housing 20 further comprises a rectangular opening along a front panel 23 providing a dispensing area 24 in which a baby bottle 120 is placed in a similar manner as that of a single cup coffee maker unit. The dispensing area 24 further comprises a hot plate 70 and a hot plate insert 72 providing a holding and heating means thereto a bottle 120 containing mixed and dispensed formula 110 therewithin.

The apparatus 10 provides a programming means via a plurality of input buttons 141, 142, 143, 144 and a digital display 140. The apparatus 10 comprises a pair of temperature increment/decrement buttons 141a, 141b, a pair of formula increment/decrement buttons 142a, 142b, a pair of time increment/decrement buttons 143a, 143b, and a plurality of recipe preset buttons 144 which are arranged across the front panel 23 of the housing 20, thereby allowing a user to preset and select particular recipes having desired temperatures, start times, and mixed volumes. The volume of mixed formula 110 is envisioned to correspond thereto different bottles 120 being, for example, two (2) ounces, four (4) ounces, six (6) ounces, eight (8) ounces, or the like.

The digital display screen 140 is flush-mounted thereto the front surface 23 and displays various process information such as, but not limited to: heated water 100 temperature, scheduled formula 110 preparation start time, desired mixture volume, and the like, being displayed thereupon user-selectable pages on the display 140. The display 140 preferably utilizes a multi-line liquid crystal display (LCD) device; however, other current display technologies may be provided with equal benefit.

A ready indicator lamp 145 and a power indicator lamp 146 are each located thereupon said front panel 23 being adjacent thereto each other which illuminate to communicate supplied electrical power and when a bottle 120 is ready for feeding, respectively.

An internal control module 56 automatically performs a sequence of timed process steps including mixing, dispensing, and heating a volume of mixed formula 110 within a bottle 120 (see FIG. 2).

Referring now to FIG. 2, a section view taken along section line A-A (see FIG. 1) of the apparatus 10, according to the preferred embodiment of the present invention, is disclosed. The apparatus 10 comprises a number of subsystems designed to provide automatic preparation of mixed and warmed baby formula 110. The apparatus 10 comprises an aesthetic plastic housing structure 20, a formula powder storage reservoir 21 having a motorized metering auger assembly 30, a pressurized warm water heating reservoir 52, a formula mixing chamber 35 having a motorized mixing impeller 40, a pinch-tube type dispensing valve 43, a first dispensing tube 47, a second dispensing tube 48, and an internal electronic control module 56 which provides electronic microprocessor control and operation of said subsystems 21, 52, 35, 43, 56. The housing 20 comprises an injection molded plastic enclosure having a generally rectangular exterior shape providing a compact and protective interior space for attachment and protection thereof the aforementioned subsystems 21, 52, 35, 43, 56. The housing 20 is envisioned to be introduced in a variety of attractive colors and patterns based upon a user's preference and decor.

The formula powder storage reservoir 21 comprises a horizontally sliding formula door 22 along a top surface to allow manual addition of a quantity of formula powder 105. The internal formula reservoir 21 comprises an isolated upper space within the housing 20 having a volumetric capacity capable of storing a sufficient quantity of formula powder 105 to make several bottles 120 of mixed formula 110 before needing to be replenished. The formula reservoir 21 comprises a hopper-shaped vessel, thereby directing said formula powder 105 thereto a motorized auger assembly 30 located thereat a bottom center region of said formula reservoir 21. The auger assembly 30 in turn provides a metered feeding means of said formula powder 105 therefrom the formula reservoir 21 thereinto a subjacent mixing chamber 35. Said flow of formula powder 105 is also controlled via a horizontally orientated formula gate 31 being located therebetween said auger assembly 30 and said mixing chamber 35. The formula gate 31 comprises a two-position shuttling device powered by a formula gate solenoid 32, thereby providing mechanical isolation therebetween the dry formula powder 105 and the wet contents of the mixing chamber 35 during mixing.

The apparatus 10 further comprises a pressurized heated water delivery system comprising a water supply line 50, a warm water reservoir 52, a warm water tube 53, a water flow solenoid valve 54, a water nozzle 55, a first thermocouple 60, and a water heater 75. A flow of supply water 100 is provided thereto the water supply line 50 via a sequential arrangement of conventional plumbing components including a connector 101 providing attachment thereto an existing water line 102, a water filter 51, and a subsequent connection thereto the water supply line 50. The water filter 51 comprises a cylindrical in-line unit being located external to the housing 20, thereby providing easy replacement and effective particulate filtration of supplied water 100. The warm water reservoir 52 comprises a pressurized vessel having a fluid volume of approximately one (1) pint to one (1) quart and comprising an internal electric water heater 75 which heats the water 100 thereto a user selectable temperature envisioned to be approximately ninety-eight degrees Fahrenheit (98° F.). A duty cycle of said water heater 75 is controlled via monitoring of a temperature of said heated water 100 by the first thermocouple 60 being located therewithin the warm water reservoir 52, thereby providing and maintaining a desired temperature. During processing, the heated water 100 is then introduced thereinto the mixing chamber 35 via an electric solenoid valve 54 and a water nozzle 55.

The mixing chamber 35 provides a mixing and dispensing means thereto the ingredients 105, 100 contained therewithin. The mixing chamber 35 comprises an internal capacity of approximately one (1) pint and further comprises a shaft-driven mixing impeller 40 power thereby a mixing motor 42, a dispensing tube mechanism 44, and a spout 46. Upon receiving a selected volume of formula powder 105 and heated water 100, the formula gate 31 and solenoid valve 54 are closed and the mixing impeller 40 agitates and mixes said ingredients 105, 100 until thoroughly blended. Said mixed formula 110 is then dispensed therethrough a static cylindrical spout portion 46 of the mixing chamber 35, and subsequently therethrough the attached dispensing tube mechanism 44. The dispensing tube mechanism 44 comprises a pinch-tube type device further comprising a short section of flexible hose being acted upon by a pinching solenoid valve 43 and an opposing stationary stop mechanism 39. The solenoid valve 43 is actuated thereby an attached electric valve solenoid 45. The mixed formula 110 in turn passes therethrough the first 47 and second 48 telescoping dispensing tubes. Said dispensing tubes 47, 48 provide a pair of stainless or plastic tubes providing an inserting sliding fit thereinto each other so as to extend downwardly thereinto a top opening portion of a baby bottle 120, thereby providing height adjustment for particular heights of different bottles 120.

The bottle 120 of mixed formula 110 is to be held in a stable manner and kept warm therewithin the dispense area 24 via a cup-shaped hot plate 70. Said hot plate 70 comprises a thermally conductive metal base having an internal resistance heating coil 71, a temperature controlling second thermocouple 65, and a hot plate insert 72. The heating coil 71 provides a controlled amount of heat thereto the hot plate 70, and subsequently thereto the bottle 120. The heating coil 71 is envisioned to comprise a common commercially available cartridge heater or equivalent device. A duty cycle of said heating coil 71 is defined thereby the control module 56 based upon a signal therefrom the second thermocouple 65 (see FIG. 3). The hot plate 70 provides a snug slip-fit attachment thereto the hot plate insert 72 which in turn provides an efficient heat conduction means thereto the bottle 120 via a cup-like nesting feature portion 73. The nesting feature 73 is located therealong a top surface of said hot plate insert 72 being approximately one-half (½) inch deep. It is envisioned that a plurality of hot plate inserts 72 would be provided with the apparatus 10 having different diameter nesting features 73, for example, small, medium, and large sizes so as to center, secure, and heat bottles 120 having standard diameters.

Referring now to FIG. 3, an electrical block diagram of the apparatus 10, according to a preferred embodiment of the present invention, is disclosed. The apparatus 10 comprises various mechanical and electrical sub systems 21, 52, 35, 43 which are controlled via an internal microprocessor-based control module 56. The control module portion 56 automatically executes imbedded software, thereby performing sequential timed process steps including mixing, dispensing, and heating utilizing the aforementioned subsystems 21, 52, 35, 43. Said control module 56 comprises a plastic enclosure located internal to the housing 20, thereby providing protective attachment thereto various electrical and electronic components necessary operation of the apparatus 10 such as, but not limited to: printed circuit boards, microprocessors, embedded software, relays, interconnecting input/output wiring 57, a power supply, a display driver, and the like. The control module 56 receives 110-volt power therefrom a standard power cord 130 being connected thereto a common household circuit. The power indicator lamp 146 provides indication of a connection thereof the power cord 130 thereto the household circuit.

To prepare the mixed formula 110, a user specified recipe is inputted thereinto the control module 56 by a user via the aforementioned temperature increment/decrement buttons 141a, 141b, formula increment/decrement buttons 142a, 142b, time increment/decrement buttons 143a, 143b, and functional push buttons 144. Instructions, settings, and description of current process status are displayed thereupon the display 140. Automatic preparation of the mixed formula 110 is executed by embedded software within said control module 56. Said control module 56 provides a plurality of output currents thereto the auger assembly 30, the formula gate solenoid 32, the water heater 75, the solenoid valve 54, the mixing motor 42, the dispensing solenoid 45, and the hot plate heating coil 71. Synchronized activation of said output currents therefrom the control module 56 are further controlled by input signals received therefrom the first thermocouple 60 and the second thermocouple 65, thereby accurately preparing the mixed formula 110.

Upon completion of the heating, mixing, and dispensing processes provided by the apparatus 10, the ready indicator light 145 is illuminated, thereby communicating thereto a user that the bottle 120 of mixed formula 110 is ready for infant feeding.

It is also envisioned that embedded software within the control module 56 be capable of executing a cleaning and/or rinsing process by allowing a volume of heated water 100 to cycle therethrough the apparatus 10, thereby removing mixed formula residue 110 therefrom all internal surfaces.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed and utilized as indicated in FIG. 1.

The method of utilizing the apparatus 10 may be achieved by performing the following steps: placing the apparatus 10 thereupon a table, countertop, or other flat surface; connecting the connector portion 101 thereto an existing supply water line 102 portion of a household water system using conventional plumbing techniques; plugging the power cord 130 thereinto a standard 120-volt duplex outlet; observing an illumination thereof the power indicator lamp 146, thereby indicating that electrical power is connected thereto the apparatus 10; accessing the formula reservoir 21 by manually sliding the formula door 22 open; pouring a desired amount of formula powder 105 thereinto the formula reservoir 21; closing the formula door 22; installing an appropriately-sized hot plate insert 72 thereinto the hot plate 70 having a corresponding bottle nesting feature 73 to support a particular diameter bottle 120 to be filled; placing said bottle 120 thereinto the dispense area 24; extending the second dispensing tube 48 downwardly into a top opening portion of the bottle 120; selecting and setting various recipe parameters required to produce a desired bottle 120 of mixed formula 110 using the temperature increment/decrement buttons 141 to select a final mixed formula 110 temperature; using the formula increment/decrement buttons 142 to select a volume of formula 105; using the time increment/decrement buttons 143 to schedule a delayed formula processing time, if desired; using additional function buttons 144 to select other parameters and functions as defined thereby the software portion of the control module 56; observing and verifying said parameters thereupon the digital display 140; initiating a pre-programmed mixing and dispensing cycle therein "immediate" or in a "delayed" mode using the delay timer function, if desired; allowing the apparatus 10 to complete water heating, mixing, and dispensing cycles in an automatic fashion; observing an illumination of the ready indicator lamp 145, thereby indicating completion of a formula preparation cycle; pushing the second dispensing tube 48 upwardly until positioned above an upper rim portion of the bottle 120; grasping and removing the bottle 120 therefrom the dispensing area 24 of the apparatus 10; feeding the mixed formula 110 thereto an infant in a normal manner; repeating the above steps to prepare additional bottles 120 of mixed formula 110 using current or new process settings being selected as described above; selecting a cleaning cycle, if desired, using the appropriate function buttons 144 to flush all mixed formula residue 110 therefrom the apparatus 10; and, benefiting from time saved while preparing mixed baby formula 110 as well as obtaining improved temperature and mixture accuracy using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A multifunctional beverage processing device for preparing, mixing and heating baby formula, said multifunctional beverage processing device comprising a housing further comprising
    an internal reservoir adapted to hold the baby formula therein;
    a motorized auger assembly located at a bottom center region of said internal reservoir, said auger assembly adapted to dispense the baby formula from said internal reservoir;
    a water reservoir situated within said housing and adapted to be connected to an existing water supply source;
    a mixing chamber adapted to mix the baby formula and water from said internal reservoir and said water reservoir respectively;
    a horizontal sliding door situated on said housing for allowing access to said internal reservoir;
    a horizontally orientated formula gate located between said auger assembly and said mixing chamber, said formula gate adapted to control flow of the baby formula from said internal reservoir to said mixing chamber;
    a dispensing tube mechanism and a plurality of dispensing tubes coupled thereto, said dispensing tube mechanism and said dispensing tubes being adapted to pass mixed baby formula therealong;
    a solenoid valve and an opposing stationary stop mechanism abutted against said dispensing tube mechanism adapted to control a flow of the mixed baby formula through said dispensing tubes;
    a dispensing area adapted to receive the mixed baby formula from said dispensing tubes;
    an internal control module communicatively coupled to said internal reservoir, said water reservoir, said mixing chamber, said solenoid valve, and said dispensing area for automatically performing a sequence of timed process steps including mixing, dispensing, and heating the baby formula;
    a connector adapted to be coupled to said existing water supply source;
    a water supply line coupled to said connector and said water reservoir;
    a water filter connected to said water supply line;
    a warm water tube partially situated within said water reservoir;
    a water flow solenoid valve connected to said warm water tube;
    a water nozzle situated inside said mixing chamber and coupled to said warm water tube;
    a first thermocouple situated within said water reservoir; and,
    a water heater situated within said water reservoir;
    wherein synchronized activation of said internal control module is controlled by input signals received from said first thermocouple; and,
    wherein said formula gate, when toggled to a closed position, isolates said internal reservoir from said mixing chamber.

2. The multifunctional beverage processing device of claim 1, wherein said mixing chamber comprises:
    a mixing motor;
    a shaft-driven mixing impeller powered by said mixing motor; and,
    a spout adapted to dispense the mixed baby formula;
    wherein said formula gate and said solenoid valve are closed when said mixing impeller is operating.

3. The multifunctional beverage processing device of claim 1, further comprising:
    a cup-shaped hot plate situated at said dispensing area, said hot plate further comprising:
        a thermally conductive metal base having an internal resistance heating coil;
        a temperature controlling second thermocouple; and,
        a hot plate insert seated on said metal base;
    wherein synchronized activation of said internal control module is controlled by input signals received from said second thermocouple.

4. A multifunctional beverage processing device for preparing, mixing and heating baby formula, said multifunctional beverage processing device comprising a housing further comprising:
    an internal reservoir adapted to hold the baby formula therein;
    a motorized auger assembly located at a bottom center region of said internal reservoir, said auger assembly adapted to dispense the baby formula from said internal reservoir;
    a warm water reservoir situated within said housing and adapted to be connected to an existing water supply source;
    a mixing chamber adapted to mix the baby formula and water from said internal reservoir and said warm water reservoir respectively;
    a horizontal sliding door situated on said housing for allowing access to said internal reservoir;
    a horizontally orientated formula gate located between said auger assembly and said mixing chamber, said formula gate adapted to control flow of the baby formula from said internal reservoir to said mixing chamber;
    a dispensing tube mechanism and a plurality of dispensing tubes coupled thereto, said dispensing tube mechanism and said dispensing tubes being adapted to pass mixed baby formula therealong;
    a pinching solenoid valve and an opposing stationary stop mechanism abutted against said dispensing tube mechanism adapted to control a flow of the mixed baby formula through said dispensing tubes;
    a dispensing area adapted to receive the mixed baby formula from said dispensing tubes;
    an internal control module communicatively coupled to said internal reservoir, said warm water reservoir, said mixing chamber, said pinching solenoid valve, and said dispensing area for automatically performing a sequence of timed process steps including mixing, dispensing, and heating the baby formula;
    a connector adapted to be coupled to the existing water supply source;
    a water supply line coupled to said connector and said warm water reservoir;
    a water filter connected to said water supply line;
    a warm water tube partially situated within said warm water reservoir;

a water flow solenoid valve connected to said warm water tube;

a water nozzle situated inside said mixing chamber and coupled to said warm water tube;

a first thermocouple situated within said warm water reservoir; and, a water heater situated within said warm water reservoir;

wherein synchronized activation of said internal control module is controlled by input signals received from said first thermocouple; and, wherein said formula gate, when toggled to a closed position, isolates said internal reservoir from said mixing chamber.

5. The multifunctional beverage processing device of claim 4, wherein said mixing chamber comprises:

a mixing motor;

a shaft-driven mixing impeller powered by said mixing motor; and, a spout adapted to dispense the mixed baby formula;

wherein said formula gate and said solenoid valve are closed when said mixing impeller is operating.

6. The multifunctional beverage processing device of claim 4, further comprising:

a cup-shaped hot plate situated at said dispensing area, said hot plate comprising a thermally conductive metal base having an internal resistance heating coil;

a temperature controlling second thermocouple; and, a hot plate insert seated on said metal base;

wherein synchronized activation of said internal control module is controlled by input signals received from said second thermocouple.

7. A method of utilizing a multifunctional beverage processing device for preparing, mixing and heating baby formula, said method comprising the steps of providing a housing by performing the following steps:

providing an internal reservoir having a motorized auger assembly located at a bottom center region thereof, said auger assembly adapted to dispense the baby formula from said internal reservoir, said internal reservoir adapted to hold said baby formula therein, said internal reservoir accessible through a horizontal sliding door;

providing and situating a warm water reservoir within said housing, further having a thermocouple and a water heater situated therein;

connecting said warm water reservoir to an existing water supply source with a connector and a water supply line having a water filter connected thereto;

providing a mixing chamber for mixing said baby formula to produce mixed baby formula and water from said internal reservoir and said warm water reservoir respectively, wherein a horizontally orientated formula gate is located between said auger assembly and said mixing chamber adapted to control flow of the baby formula from said internal reservoir to said mixing chamber;

providing a dispensing tube mechanism;

providing and coupling a plurality of dispensing tubes to said dispensing tube mechanism;

providing a pinching solenoid valve and an opposing stationary stop mechanism;

providing a dispensing area adapted to receive said mixed baby formula from said dispensing tubes;

providing and communicatively coupling an internal control module to said internal reservoir, said warm water reservoir, said mixing chamber, said pinching solenoid valve, and said dispensing area for automatically performing a sequence of timed process steps including mixing, dispensing, and heating said baby formula;

passing said mixed baby formula along said dispensing tube mechanism and said dispensing tubes; and, controlling a flow of said mixed baby formula through said dispensing tubes by abutting said pinching solenoid valve and said stop mechanism against said dispensing tube mechanism.

\* \* \* \* \*